(12) United States Patent
Chai et al.

(10) Patent No.: US 7,215,980 B2
(45) Date of Patent: May 8, 2007

(54) PEN-TYPE MOBILE TELEPHONE

(75) Inventors: Yongsen Chai, Qingdao (CN);
Chunguang Song, Qingdao (CN);
Xiangji Li, Qingdao (CN); Xintao Sun, Qingdao (CN)

(73) Assignees: Haier Group Corporation, Shandong (CN); Qingdao Haier Telecom Co., Ltd., Shandong (CN)

( * ) Notice: Subject to any disclaimer, the term of this patent is extended or adjusted under 35 U.S.C. 154(b) by 0 days.

(21) Appl. No.: 10/540,170

(22) PCT Filed: Jan. 30, 2003

(86) PCT No.: PCT/CN03/00108

§ 371 (c)(1),
(2), (4) Date: Dec. 19, 2005

(87) PCT Pub. No.: WO2004/056072

PCT Pub. Date: Jul. 1, 2004

(65) Prior Publication Data

US 2006/0154688 A1    Jul. 13, 2006

(30) Foreign Application Priority Data

Dec. 18, 2002    (CN) .............................. 02 1 59105

(51) Int. Cl.
*H04M 1/00*    (2006.01)

(52) U.S. Cl. ............... 455/575.1; 455/90.3; 455/550.1; 455/558; 455/557; 379/144.04; 379/433.09

(58) Field of Classification Search ............. 455/575.1, 455/903, 424, 425, 456.5, 456.6, 442.1, 514, 455/66.1, 550.1, 556.2, 557, 558, 561, 566, 455/95, 100, 334, 333, 344, 346, 347, 349; 345/179, 158, 173–176, 177; 235/486, 482, 235/462.47, 382; 379/144.01, 433.04, 433.09, 379/201.06, 144.04, 433.05; 257/686, 678, 257/685, 668

See application file for complete search history.

(56) References Cited

U.S. PATENT DOCUMENTS 6,053,304 A * 4/2000 Biagiotti ..................... 198/794

(Continued)

*Primary Examiner*—Edward F. Urban
*Assistant Examiner*—Charles Chow
(74) *Attorney, Agent, or Firm*—Greenberg Traurig LLP; Gerard F. Diebner

(57) ABSTRACT

A kind of pen-type mobile telephone. It comprises: housing (1), display (2), button (3, 4, 5), telephone receiver (6), earphone (7), etc. It is characterized in that said pen-type mobile telephone's housing possesses slender rod-form; said display (2) is slender and in longitudinal setting; In said housing (1), also included are: printed circuit board (11), radio frequency module (12), fundamental frequency module (13), and SIM card plug & receptacle (14); said printed circuit board (11) uses more than 6 layer printed circuit board, with its width less than the width of the housing (1); widths of said radio frequency module (12) and fundamental frequency module (13) are also less than the width of the housing; socket (9) inserted with SIM card plug & receptacle is set at the side face of said housing (1), and said SIM card plug & receptacle (14) uses drawer-type SIM plug receptacle. The volume of said housing (1) is less than: length 140 mm×width 35 mm×thickness 23 mm.

12 Claims, 2 Drawing Sheets

U.S. PATENT DOCUMENTS 6,104,603 A * 8/2000 Wang ......................... 361/679
6,671,497 B2 * 12/2003 Liu et al. ................... 455/90.3
2002/0014076 A1 * 2/2002 Blackburn et al. ............ 60/508
2002/0065104 A1 * 5/2002 Hess et al. .................. 455/557

* cited by examiner

PEN-TYPE MOBILE TELEPHONE

TECHNICAL FIELD

The present invention relates to a mobile telephone terminal device, commonly named as mobile phone. More specifically, the present invention relates to a terminal device of slender rod-formed pen-like mobile telephone, referred to as pen-type mobile telephone for short.

BACKGROUND TECHNOLOGY

In recent years, along with the development of mobile telecommunication technology, mobile telephone is increasingly popularized. The user's demand on the terminal of mobile telephone, namely the mobile telephone, is increasingly higher. Its main point is to demand the design of mobile telephone to develop in the direction of miniaturization. Thus, lighter, thinner and smaller is the target pursued by mobile telephone manufacturers. Therefore, various miniature mobile telephones increasingly come out in succession.

For the direct-holding type mobile telephone, if the length of mobile telephone is too short, it will result in unclear transmitted voice. And the width of display screen can not be make too narrow due to the horizontal arrangement. Both length and width are subject to certain limitation. Thus it is difficult to design a further smaller direct-holding type mobile telephone. At present, the minimum size for the direct-holding type mobile telephone is about 90 mm×45 mm×18 mm.

In order to make mobile telephone exquisite with the earphone and microphone of mobile telephone being within the suitable relation of proportion, the flip-type miniature mobile telephone is invented. However, although the flip type mobile telephone reduces the length, but meanwhile it increases the thickness of mobile telephone. Moreover, the structure of flip type mobile telephone is too complex, and it puts higher requirements on the use performance and reliability. Thus the cost is higher, thus it is expensive. At present, the minimum flip type mobile telephone is 78 mm×42 mm×20 mm.

At the present technical level, it is almost impossible to make mobile telephone smaller. It is an affair daring not to think of making mobile telephone with size similar to that of a pen. Because it is necessary for mobile telephone not only to install display, control button, control key, digit and function key, telephone receiver, and earphone etc., but also to install lot of mobile telephone's wafer and its affiliated circuit, SIM card, cell and other auxiliary elements and parts. In accordance with the conventional circuit design and on the basis of the traditional way of thinking, it is impossible to make mobile telephone smaller.

To sum up, there exist the following shortcomings for the existing miniature mobile telephone:

1. Due to present design in wafer of mobile telephone and the scale of its affiliated circuit, it is impossible for the area of internal circuit to be made smaller.

2. As the digital display of mobile telephone is in horizontal arrangement, at least an 11-bit digit should be arranged for one line. Thus the width of display screen can not be made too narrow. Therefore the width of mobile telephone should be correspondingly wider, limiting the contour of mobile telephone to develop in the direction of being narrower.

3. For traditional mobile telephone, setting SIM locking socket in housing for the installation of SIM leads to the difficulty for conventional mobile telephone to reduce thickness.

4. Moreover external cell is installed at said SIM locking socket to cover this SIM card, and external cell itself must possess plastic housing, therefore, the thickness of conventional mobile telephone further increases.

5. As the digit key of mobile telephone is in horizontal arrangement, therefore mobile telephone can only be operated in vertical direction. The operation mode is single, and sometimes the use is not convenient. Above-mentioned various problems limit mobile telephone to develop in the direction of being in slender form.

SUMMARY OF THE INVENTION

The aim of the invention is to overcome the above-mentioned shortcomings in existing mobile telephone, thus to provide a kind of slender rod-formed pen-like terminal device of mobile telephone, namely a kind of pen-type mobile telephone. It changes the basic characteristics of structure for traditional mobile telephone. Via novel structure and creative design, it can rationally install various functional modules realizing terminal device of mobile telephone in pen type housing, to make both its carrying and use very convenient.

The pen-type mobile telephone according to the present invention includes: housing, display, button, telephone receiver, earphone etc., wherein, the housing of said pen-type mobile telephone is in slender rod form; said display is in slender form and in longitudinal setting, namely the long side is in up and down direction, while the wide side is in left and right direction; in said housing also included are: printed circuit board, circuit part and SIM card plug and receptacle; said printed circuit board uses more than 6 layer printed circuit board, with a width less than the width of the housing; said circuit part is mainly divided into radio frequency module and fundamental frequency module, with the widths of both modules being smaller than the width of the housing.

In accordance with above-mentioned pen-type mobile telephone, a socket inserted with SIM card plug & receptacle is set at the side face of housing, and said SIM card plug & receptacle are drawer-type SIM card plug & receptacle.

In accordance with above-mentioned pen-type mobile telephone, the volume of said housing is less than: length 140 mm×width 35 mm×thickness 23 mm.

In accordance with above-mentioned pen-type mobile telephone, the volume of said housing is less than: length 140 mm×width 25 mm×thickness 18 mm.

In accordance with above-mentioned pen-type mobile telephone, a hang buckle is installed at the top or the back of the housing;

In accordance with above-mentioned pen-type mobile telephone, said printed circuit board is an 8 layer printed circuit board.

In accordance with above-mentioned pen-type mobile telephone, a function expansion area is set at the bottom of above-mentioned printed circuit board.

In accordance with above-mentioned pen-type mobile telephone, a multiple-in-one socket is installed at above-mentioned printed circuit board.

In accordance with above-mentioned pen-type mobile telephone, a vibrating motor is installed at above-mentioned printed circuit board.

In accordance with above-mentioned pen-type mobile telephone, a laser is set at said printed circuit board and at a position corresponding to a laser exit set at the bottom of the housing.

In accordance with above-mentioned pen-type mobile telephone, above-mentioned pen-type mobile telephone uses built-in cell.

In accordance with above-mentioned pen-type mobile telephone, above-mentioned pen-type mobile telephone uses built-in antenna.

In accordance with above-mentioned pen-type mobile telephone, above-mentioned button includes digit keys and function keys. They are in oblique arrangement, with angles of inclination between 30°~60°.

Detailed description of the concrete embodiments of the invention will be made in the following in combination with the attached drawings.

BRIEF DESCRIPTION OF THE ATTACHED DRAWINGS

Figures 1, 2:
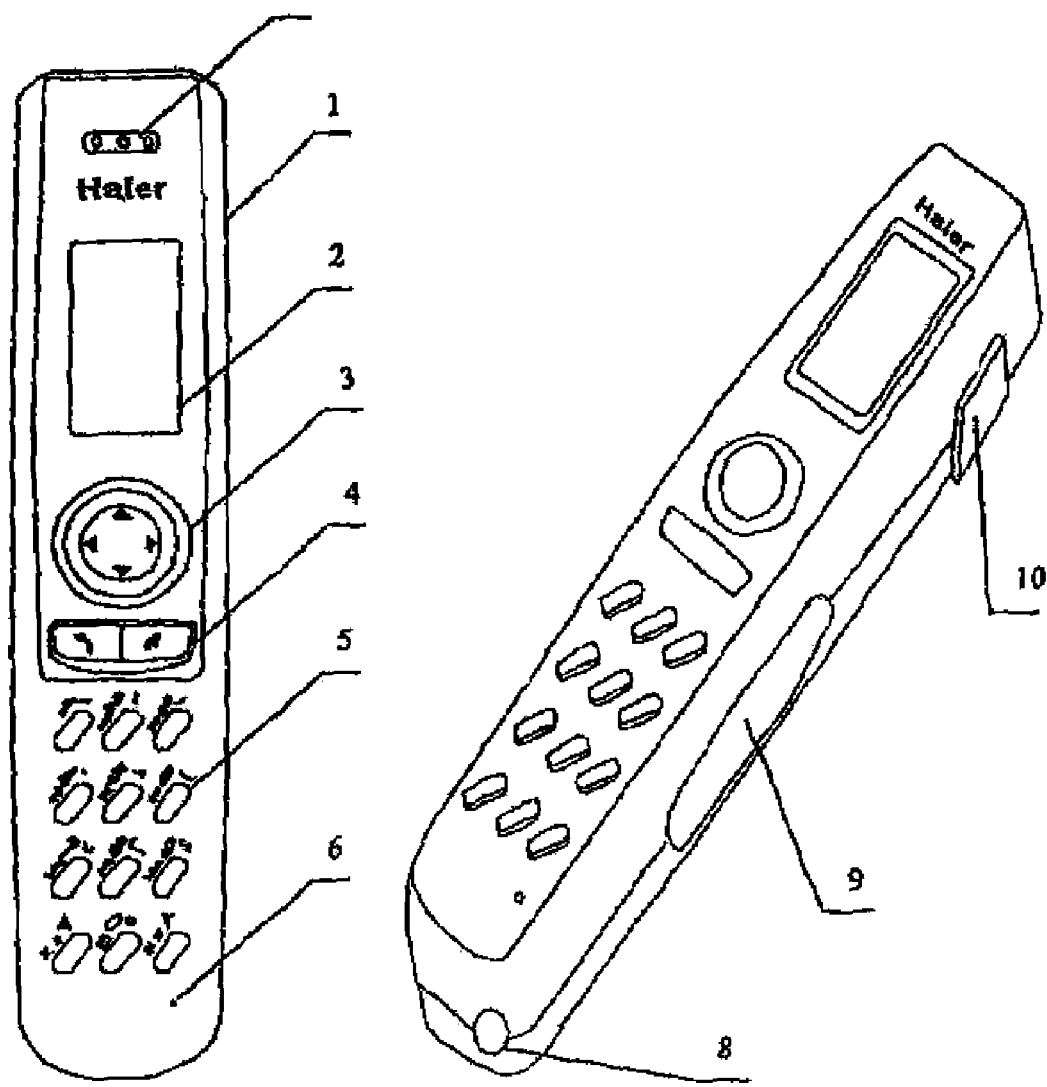
FIG. 1 is front elevation view of a pen-type mobile telephone in accordance with an embodiment of the invention.
FIG. 2 is side perspective drawing of a pen-type mobile telephone in accordance with an embodiment of the invention.

In the drawings,
1. Housing (1A, front cover, 1B back cover),
2. Display;
3. Button;
4. Operating key;
5. Digit and function keys;
6. Telephone receiver;
7. Earphone;
8. Laser exit;
9. Socket of SIM card plug & receptacle;
10. Hang buckle;
11. Printed circuit board;
12. Radio frequency module;
13. Fundamental frequency module;
14. Drawer-type SIM plug & receptacle (14A, drawer-type SIM locking socket);
15. Function expansion area;
16. Multiple-in-one socket;
17. Built-in antenna;
18. Buzzer;
19. Built-in cell;
20. Screw hole;
21. Locking socket;
22. Jack catch;
23. Vibrating motor;
24. Laser.

DETAILED DESCRIPTION OF THE PREFERRED EMBODIMENTS

Referring to FIG. 1, it is shown the front elevation view for contour of a pen type mobile telephone according to an embodiment of the present invention. It can be seen from the figure that a pen type mobile telephone in accordance with the invention includes housing 1, display 2, button 3, operating key 4, digit and function key 5, telephone receiver 6, and earphone 7, which are needed by terminal of mobile telephone. What is different with terminal of conventional mobile telephone is that the pen type mobile telephone possesses slender rod-form and small volume; easy to insert into pocket. In accordance with the embodiment, concrete size of housing 1 is: length 140 mm×width 35 mm×thickness 23 mm; Ratio between length and width is more than 4:1. In addition, hang buckle 10 is installed at its top and back (refer to FIG. 2), so as to be convenient to hang in pocket, convenient for carrying like a pen.

Referring to FIG. 2, a socket 9 inserted with drawer-type SIM card plug & receptacle is set at the side face of pen-type mobile telephone of the invention. Detailed explanation will be given for drawer-type SIM card plug & receptacle in the following in combination with FIG. 3. In accordance with a kind of expansion for the invention, a laser exit 8 is set at the bottom of the pen-type mobile telephone.

In order to realize the slender rod-formed pen-type mobile telephone, display 2 of the invention is slender and in longitudinal setting, namely the long side is in up and down direction, and the wide side is in left and right direction. Length of the display is 40~60 mm, while the wide side is 22~32 mm.

In addition, it is allowed to make oblique arrangement for said digit and function key 5, with angle of inclination between 30°~60, so as to arrange these digit and function keys 5 in the narrow & long area. Moreover, when the user dials, it can be used for operation both in vertical direction and horizontal direction, giving the user convenience.

In addition, the more important is that various function parts in terminal of mobile telephone should be installed in the slender rod-formed housing 1. Moreover it is necessary not only to bring into normal play the functions of various parts, but also to ensure the quality of call and convenience of use for the entire device. In the following, internal structure of the pen-type mobile telephone of the invention will be explained in combination with FIG. 3 and FIG. 4.

Figure 3:
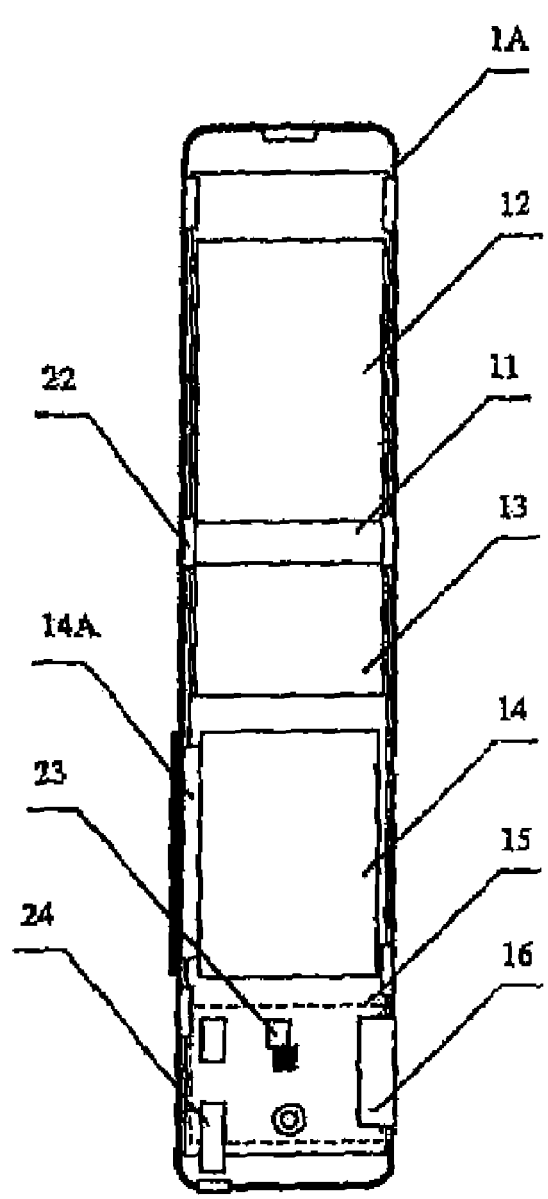
FIG. 3 is schematic diagram for internal structure of a pen-type mobile telephone in accordance with an embodiment of the invention. It shows structure layout of various parts in the front cover 1A.

FIG. 3 shows internal structure of pen-type mobile telephone for the invention. In concrete terms, it shows structure layout of various parts in front cover 1A.

In reference to FIG. 3, in accordance with internal structure of pen-type mobile telephone for the invention, it mainly includes: printed circuit board 11, radio frequency module 12, fundamental frequency module 13, SIM card plug & receptacle 14. In order to make circuit more compact, fine and close, the printed circuit board in the invention uses more than 6 layer printed circuit board, for example 7 layer or 8 layer, even 9~10 layer printed circuit board. Width of the printed circuit board is smaller than the width of the housing 1, namely front cover 1A. The circuit part is mainly divided into radio frequency module 12 and fundamental frequency module 13. The widths of both modules must be less than 35 mm.

Through internal use of more than 6 layer printed circuit board, designing the main circuit part into radio frequency module and fundamental frequency module with their width less than the width of the slender and long housing in accordance with the above-mentioned novel structure layout, the basic aim of the invention is achieved, namely based on the pen-type mobile telephone of the invention, it is possible to make its width less than 35 mm, even less than 25 mm.

In order to make the thickness of pen-type mobile telephone for the invention smaller, less than 23 mm, the invention especially uses a novel drawer-type plug & receptacle 14. It is mainly composed of a drawer-type locking socket 14A and a card fixing device, with a size less than 30 mm for length and less than 20 mm for width. The concrete structure and detailed explanation about this kind of drawer-type SIM card plug & receptacle will not be given here and reference is directed to the not yet published patent application No. 02269510.9 applied for by the applicant. The emphasis here is given to its manner of the insertion connection. As the patterns of drawer-type side-insertion or direct insertion and flatwise placement are used to place and fix the SIM card, the body of pen-type mobile telephone in accordance with the invention can be made narrower, namely the thickness is smaller. This is because this kind of inserting and drawing-out of the SIM card from side like operating a drawer can avoid the increase of body thickness resulting from setting and installation of SIM locking socket in the housing, and therefore it is allowed to install cell inside the housing 1. Thus it is allowed to further reduce the thickness of the pen-type mobile telephone. But traditional mobile telephone must use external cell, because in installing or dismantling the SIM card, it is necessary to dismantle external cell that covers the SIM card. External cell itself must have plastic housing, thus it cannot but increase the thickness of the mobile telephone.

Figure 4:
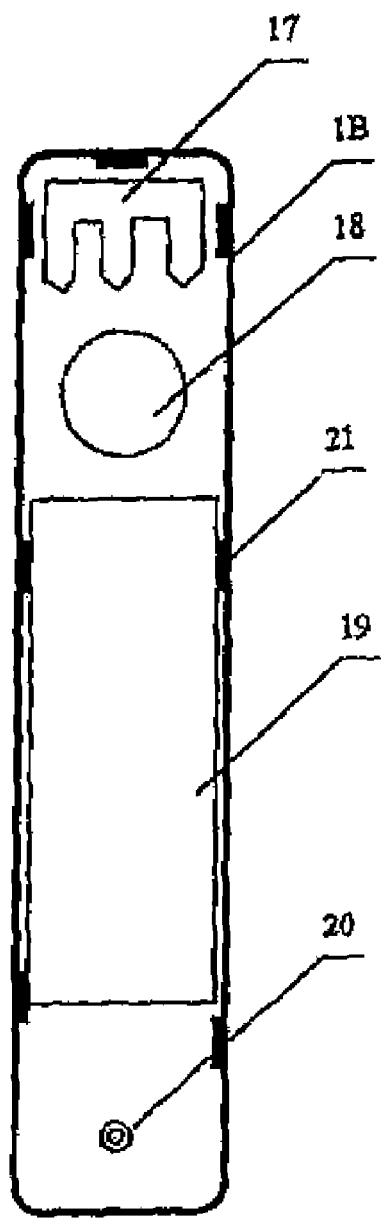
FIG. 4 is a schematic diagram for internal structure of a pen-type mobile telephone in accordance with an embodiment of the invention. It shows structure layout of various parts in the back cover 1B.

In order to further reduce the thickness of a pen-type mobile telephone of the present invention, a pen-type mobile telephone of the present invention in accordance with an embodiment uses a built-in cell 19 (refer to FIG. 4). Because the built-in cell 19 does not need above-mentioned necessary plastic housing as an external cell does, the pen-type mobile telephone of the invention can make its thickness very small, for example less than 20 mm.

In accordance with the above-mentioned pen-type mobile telephone, said housing (1) can be made less than: length 140 mm×width 25 mm×thickness 18 mm.

In reference to FIG. 4, the pen-type mobile telephone in accordance with the invention includes also built-in antenna 17, buzzer 18 in back cover 1B. In the figure, reference sign 20 indicates a screw hole for installation. It is also the sole screw hole for installation in the embodiment. Installation of the back cover 1B and front cover 1A depends mainly on coordination between several locking sockets 21 and several card catches 22 at front cover 1A to have close combination, and meanwhile through installation of screw in screw hole 20 to reach the purpose of firmness.

In reference to FIG. 3 again, the pen-type mobile telephone in accordance with the invention sets a function expansion area at the bottom of slender printed circuit board 11. In order to realize the functions of earphone, charging and data interface etc., a multiple-in-one socket 16 is installed in function expansion area of the pen-type mobile telephone of the invention, and it is a three-in-one socket in the embodiment. In addition, in the function expansion area 15, it is allowed to install vibrating motor 23 for "calling number display" and/or a laser for a laser pen.

The above content gives detailed description about concrete embodiments of the invention, but the invention is not limited to this. What should be understood is that in accordance with the thought of the invention, common technicians in the technical field can make various variations, retrofit, addition or replacement. They all belong to the protection scope of the invention. The protection scope of the invention should be determined by the claims.

The invention claimed is:

1. A pen-type mobile telephone, comprising:
housing (1), display (2), button (3, 4, 5), telephone receiver (6), and earphone (7) wherein,
said housing (1) of said pen-type mobile telephone has a shape of slender rod-form;
said display (2) is in slender form and in longitudinal setting, namely the long side in up and down direction, the wide side in left and right direction;
in said housing (1) also included are: printed circuit board (11), circuit part (12, 13) and
drawer-type SIM card plug and receptacle (14) wherein a socket (9) inserted with the drawer-type SIM card plug and receptacle (14) set in a side face of the housing;
said printed circuit board (11) uses more than 6 layer printed circuit board, with a width smaller than the width of the housing (1);
said circuit part (12, 13) is mainly divided into radio frequency module (12) and fundamental frequency module (13), the widths of the two modules are also smaller than the width of the housing.

2. A pen-type mobile telephone, comprising:
housing (1), display (2), button (3, 4, 5), telephone receiver (6), and earphone (7), wherein,
said housing (1) of said pen-type mobile telephone has a shape of slender rod-form;
said display (2) is in slender form and in longitudinal setting, namely the long side in up and down direction, the wide side in left and right direction;
in said housing (1) also included are: printed circuit board (11), circuit part (12, 13) and card plug and receptacle (14);
said printed circuit board (11) uses more than 6 layer printed circuit board, with a width smaller than the width of the housing (1) and a multiple-in-one socket (16) is installed at said printed circuit board (11);
said circuit part (12, 13) is mainly divided into radio frequency module (12) and fundamental frequency module (13), the widths of the two modules are also smaller than the width of the housing.

3. A pen-type mobile telephone comprising:
housing (1), display (2), button (3, 4, 5), telephone receiver (6), and earphone (7), wherein, said housing (1) of said pen-type mobile telephone has a shape of slender rod-form;
said display (2) is in slender form and in longitudinal setting, namely the long side in up and down direction, the wide side in left and right direction;
in said housing (1) also included are: printed circuit board (11), circuit part (12, 13) and card plug and receptacle (14) wherein at said printed circuit board (11) a laser (24) is provided at a position corresponding to a laser exit (8) set at the bottom of the housing;
said printed circuit board (11) uses more than 6 layer printed circuit board, with a width smaller than the width of the housing (1);
said circuit pan (12, 13) is mainly divided into radio frequency module (12) and fundamental frequency module (13), the widths of the two modules are also smaller than the width of the housing.

4. A pen-type mobile telephone, comprising:
housing (1), display (2), button (3, 4, 5) telephone receiver (6), and earphone (7), wherein said button includes digit keys and function keys (5) in oblique arrangement, with angles of inclination between 30°~60°;

said housing (1) of said pen-type mobile telephone has a shape of slender rod-form;

said display (2) is in slender form and in longitudinal setting, namely the long side in up and down direction, the wide side in left and right direction;

in said housing (1) also included are: printed circuit board (11), circuit part (12, 13) and card plug and receptacle (14);

said printed circuit board (11) uses more than 6 layer printed circuit board, with a width smaller than the width of the housing (1);

said circuit part (12, 13) is mainly divided into radio frequency module (12) and fundamental frequency module (13), the widths of the two modules are also smaller than the width of the housing.

5. The pen-type mobile telephone according to any one of claims 1, 2, 3 or 4, wherein the volume of said housing (1) is less than: length 140 mm×width 35 mm×thickness 23 mm.

6. The pen-type mobile telephone according to any one of claims 1, 2, 3 or 4, wherein the volume of said housing (1) is less than: length 140 mm×width 25 mm×thickness 18 mm.

7. The pen-type mobile telephone according to any one of claims 1, 2, 3 or 4, wherein a hang buckle (10) is installed at the top or the back of the housing (1).

8. The pen-type mobile telephone according to any one of claims 1, 2, 3 or 4, wherein said printed circuit board (11) is an 8 layer printed circuit board.

9. The pen-type mobile telephone according to any one of claims 1, 2, 3 or 4, wherein a function expansion area (15) is set at the bottom of said printed circuit board (11).

10. The pen-type mobile telephone according to any one of claims 1, 2, 3 or 4, wherein a vibrating motor (23) is installed at said printed circuit board (11).

11. The pen-type mobile telephone according to any one of claims 1, 2, 3 or 4, wherein said pen-type mobile telephone uses built-in cell (19).

12. The pen-type mobile telephone according to any one of claims 1, 2, 3 or 4, wherein said pen-type mobile telephone uses built-in antenna (17).

* * * * *